United States Patent
Mathew et al.

(10) Patent No.: US 12,243,258 B1
(45) Date of Patent: Mar. 4, 2025

(54) GAZE TARGET DETECTION METHOD AND SYSTEM

(71) Applicant: Elm Company, Riyadh (SA)

(72) Inventors: Athul M. Mathew, Riyadh (SA); Arshad Ali Khan, Riyadh (SA); Riad Souissi, Riyadh (SA)

(73) Assignee: Elm Company, Riyadh (SA)

( * ) Notice: Subject to any disclaimer, the term of this patent is extended or adjusted under 35 U.S.C. 154(b) by 0 days.

(21) Appl. No.: 18/882,039

(22) Filed: Sep. 11, 2024

Related U.S. Application Data

(60) Provisional application No. 63/537,705, filed on Sep. 11, 2023.

(51) Int. Cl.
    *G06K 9/00*     (2022.01)
    *G06T 7/50*     (2017.01)
    *G06T 7/70*     (2017.01)

(52) U.S. Cl.
CPC .............. *G06T 7/70* (2017.01); *G06T 7/50* (2017.01); *G06T 2207/10028* (2013.01); *G06T 2207/20081* (2013.01); *G06T 2207/20084* (2013.01); *G06T 2207/30201* (2013.01)

(58) Field of Classification Search
CPC ................................ G06F 3/013; G06F 3/012
See application file for complete search history.

(56) References Cited

U.S. PATENT DOCUMENTS

| | | | |
|---|---|---|---|
| 2019/0317594 A1* | 10/2019 | Stent | G05D 1/0221 |
| 2020/0357174 A1* | 11/2020 | Banerjee | G06V 40/20 |
| 2023/0042756 A1* | 2/2023 | Song | B25J 9/161 |
| 2023/0085156 A1* | 3/2023 | Prasad | H04N 19/164 |
| | | | 709/219 |
| 2023/0245419 A1* | 8/2023 | Li | G06V 10/426 |
| | | | 382/190 |
| 2024/0096042 A1* | 3/2024 | Ikizyan | G06T 5/50 |

OTHER PUBLICATIONS

Assens Reina, Marc, et al. "Saltinet: Scan-path prediction on 360 degree images using saliency volumes." Proceedings of the IEEE international conference on computer vision workshops. 2017. (Year: 2017).*

* cited by examiner

*Primary Examiner* — Hadi Akhavannik
(74) *Attorney, Agent, or Firm* — Finnegan, Henderson, Farabow, Garrett & Dunner, LLP

(57) ABSTRACT

A method of determining a target of a subject's gaze from an image of the subject within a scene is disclosed. The method comprises analyzing the image and determining information associated with the image. A processor configured to analyze the image and determine information associated with the image is also disclosed. Finally, a non-transitory computer readable storage device comprising computer executable instructions for determining a target of a subject's gaze is disclosed.

28 Claims, 15 Drawing Sheets

| Method | VideoAttentionTarget | | GOO-Real | |
|---|---|---|---|---|
| | AUC↑ | Dist. ↓ | AUC↑ | Dist. ↓ |
| Random (Chong et al., 2020) | 0.505 | 0.458 | - | - |
| Fixed Bias (Chong et al., 2020) | 0.728 | 0.326 | - | - |
| Recansens et al. (Recasens* et al., 2015) | - | - | 0.850* | 0.220* |
| Lian et al. (Lian et al., 2019) | - | - | 0.840* | 0.321* |
| Chong et al. (Chong et al., 2018) | 0.830 | 0.193 | - | - |
| VideoAttn[†] (Chong et al., 2020) | 0.854 | 0.147 | - | - |
| VideoAttn (Chong et al., 2020) | 0.860 | 0.134 | 0.796* | 0.252* |
| Fang et al. (Fang et al., 2021) | 0.905 | 0.108 | - | - |
| Jin et al. (Jin et al., 2022) | 0.901 | 0.116 | - | - |
| Bao et al. (Bao et al., 2022) | 0.885 | 0.120 | - | - |
| Tonini et al. (Tonini et al., 2022) | 0.940 | 0.129 | 0.918 | 0.164 |
| Ours[‡] | 0.958 | 0.123 | 0.876 | 0.208 |
| Ours | 0.964 | 0.100 | 0.954 | 0.130 |
| Human | 0.921 | 0.051 | - | - |

FIG. 8A

| Method | AUC↑ | Dist. ↓ | Min. Dist. ↓ | Angle↓ |
|---|---|---|---|---|
| Random | 0.504 | 0.484 | 0.391 | 69.0 |
| Center | 0.633 | 0.313 | 0.230 | 49.0 |
| Fixed Bias | 0.674 | 0.306 | 0.219 | 48.0 |
| Recansens et al. (Recasens* et al., 2015) | 0.878 | 0.190 | 0.113 | 24.0 |
| Chong et al. (Chong et al., 2018) | 0.896 | 0.187 | 0.112 | - |
| Lian et al. (Lian et al., 2019) | 0.906 | 0.145 | 0.081 | 17.6 |
| VideoAttn[†] (Chong et al., 2020) | 0.921 | 0.137 | 0.077 | - |
| Fang et al. (Fang et al., 2021) | 0.922 | 0.124 | 0.067 | 14.9 |
| Jin et al. (Jin et al., 2022) | 0.923 | 0.120 | 0.064 | 14.8 |
| Tonini et al. (Tonini et al., 2022) | 0.927 | 0.141 | - | - |
| Bao et al. (Bao et al., 2022) | 0.928 | 0.122 | - | 14.6 |
| Ours | 0.932 | 0.133 | 0.073 | 19.3 |
| Human | 0.924 | 0.096 | 0.040 | 11.0 |

FIG. 8B

GAZE TARGET DETECTION METHOD AND SYSTEM

CROSS REFERENCE TO RELATED APPLICATION

This application claims the benefit of priority to U.S. Provisional Application No. 63/537,705, filed on Sep. 11, 2023, the contents of which are incorporated herein by reference in its entirety.

TECHNICAL FIELD

The present disclosure generally relates to a gaze target detection system and method. The herein disclosed system and method can have a wide range of applications, including human-computer interaction, educational assessment, treatment of patients with attention disorders, ADHD (Attention Deficit Hyperactivity Disorder) and many more.

BACKGROUND

Gaze target detection and prediction aim to determine and/or predict the gaze of a human subject in scene from a captured image. Human beings have a remarkable capability of determining the gaze direction of others, to understand whether a person is looking at them, to follow other people's gazes to identify their targets, and to determine the subject of others' gazes. In the last decade deep learning-based neural networks have revolutionized the way gaze tracking is captured and gaze target predictions are performed. Appearance based models use deep convolutional neural networks (CNN) to directly estimate the direction of gaze and pinpointing it to the gaze target in the camera frame.

Human gaze estimation plays a critical role in human-centered Computer Vision (CV) applications such as human computer interaction, human-artefacts and human-human interaction in places like conference halls, museums, art galleries and educational establishments. Significant progress has been made in automatic gaze estimation or AI-enabled attention estimation, but it is still a challenge to develop it and deploy it everywhere due to lots of variations in environments, high computational cost, and lack of quality data.

The automatic detection and quantification of the visual attention of other people from images and video remains a complex and tough challenge. Many of the prior art systems require iris or eye tracking for gaze detection. Such systems are unable to accurately predict gaze attention where the eyes and/or irises of the subject are not visible from the captured image data. Previous systems and methods require accurate localization of the eye for estimation of gaze target. The requirement for accurate eye localization, however, requires an immense amount of computation. In addition, it also limits the system performance because eyes may be occluded or only partially visible in real-life in the wild configurations.

Another technique or method used in gaze target detection is joint multi-party Visual Focus of Attention (VFOA) recognition from head pose and multi-modal contextual cues. Rather than independently recognizing the VFOA of each participant from the participant's own head pose, the research proposes to recognize participants' VFOA jointly in order to introduce context dependent interaction models that relate to group activity and the social dynamics of communication.

There have been significant developments in 2D gaze and saliency mapping, but robust 3D gaze orientation determination from head pose is still a challenging problem. Further research has been carried out proposing a 3D gaze model which extends existing models to include temporal information and to directly output an estimate of gaze uncertainty. However, without considering the monocular depth-based gaze direction estimation, this research would struggle to interpret additional contextual cues at the time of estimating gaze direction.

Prior art gaze tracking systems are only able to determine the gaze direction. This is achieved by checking the facial orientation and the eye pupil location to determine the gaze angle in terms of yaw, pitch, and roll angles. Typical gaze tracking systems often require a calibration step, where the user is asked to look at various specific points before usage of such a system. Also, such gaze tracking systems are constrained because these systems are designed to monitor the gaze of one person when the person is well situated within the confined monitored space of the gaze tracking system. An example of such a system is a driver attention or fatigue detection system in vehicles, where the system is configured to monitor the gaze of the driver seated in the driving seat.

It is an object of at least some of the embodiments of the disclosure, to provide an improved system and method of determining gaze target from an image.

SUMMARY

Systems and methods are disclosed for detecting a target of a subject's gaze from an image.

In accordance with an aspect of the disclosure, there is provided a method of determining a target of a subject's gaze from an image of a subject within a scene. The method may comprise analyzing the image and determining information associated with the image. The image information may comprise: information associated with a head of the subject in the image, information associated with the location of the subject within the scene captured in the image, and depth information associated with the subject and one or more objects comprised in the scene. A depth-infused saliency map may be generated, using a first trained neural network, using the determined image information. The method may further comprise determining the target of the subject's gaze using the determined image information and the depth-infused saliency map. For example, determining the target of the subject's gaze using the determined image information and the depth-infused saliency map may comprise generating a heatmap identifying one or more potential targets of the subject's gaze in the image, each potential target being associated with a probability score representing the likelihood that the subject target is the target of the subject's gaze.

In accordance with some exemplary embodiments, determining the target of the subject's gaze using the determined image information and the depth-infused saliency map may comprise identifying, using a second trained neural network, information associated with an orientation of the head of the subject, based on the information associated with the head of the subject in the image, identifying, using the second trained neural network, depth relevance information, based on information associated with the orientation of the head of the subject and the depth-infused saliency map, wherein the depth relevance information comprises information associated with one or more objects or a region that lie along a line-of-sight of the subject in the image, and, identifying, using the second trained neural network, spatial relevance information, based on information associated with the orientation of the head of the subject and the information associated with the location of the subject within the scene, wherein the spatial relevance information comprises information indicative of the relative spatial position of the subject's head within the image.

Determining the target of the subject's gaze using the determined image information and the depth-infused saliency map may also comprise identifying, using a third trained neural network, information indicative of the imaged objects comprised in the scene, based on the image and the information associated with the location of the subject within the scene.

Determining the target of the subject's gaze using the determined image information and the depth-infused saliency map may further comprise identifying, using a fourth trained neural network, information indicative of the relative distance between imaged objects comprised in the scene, based on the depth-infused saliency map and the depth information associated with the subject and one or more objects comprised in the scene.

In some embodiments, determining the target of the subject's gaze using the determined image information and the depth-infused saliency map may further comprise combining, using a fifth trained neural network, the depth relevance, the information indicative of the imaged objects comprised in the scene, and the information associated with an orientation of the head of the subject, and encoding the combination, combining, using the fifth trained neural network, the spatial relevance, the information indicative of the relative distance between imaged objects comprised in the scene, and the information associated with an orientation of the head of the subject, and encoding the combination, and, fusing and decoding the encoded information using the fifth trained neural network.

In some embodiments, the functionality of the first, second, third, fourth and fifth trained neural networks may be implemented using one or more neural networks. For example, it is envisaged that the functionality of the first, second, third, fourth and fifth trained neural networks may be implemented using a single neural network. The single neural network may comprise a plurality of components, each component may be configured to implement the functionality of a different one of the first, second, third, fourth and fifth trained neural networks. Similarly, in some embodiments the functionality of the first, second, third, fourth and fifth trained neural networks may be implemented using two neural networks. The precise number of neural networks used to implement the functionality of the first, second, third, fourth and fifth trained neural networks is immaterial, and embodiments are envisaged in which the same functionality afforded by the above described first, second, third, fourth and fifth trained neural networks may be implemented using one or more different neural networks.

In accordance with an aspect of the disclosure, there is provided a method of training a neural network to generate a depth-infused saliency map for determining a target of a subject's gaze from an image of a subject within a scene. The method may comprise inputting a plurality of images of a plurality of scenes into a pre-processing unit and analyzing, using the pre-processing unit, the images and determining information associated with the images. The image information may comprise information associated with a head of the subject in each image, information associated with the location of the subject within the scene, and depth information associated with the subject and one or more objects comprised in each image. The method may further comprise inputting, from the pre-processing unit, the determined image information for each image into the training unit, and generating, using the training unit, a plurality of pseudo-labels from the plurality of images.

For example, generating a pseudo-label from an image may comprise generating a 3D point cloud using the depth information associated with the subject and one or more objects comprised in the image, and intrinsic parameters of the camera, generating a projected cuboid using the 3D point cloud and information associated with the angle between the subject's face and the known target gaze point, and projecting the cuboid in the image plane. The information associated with the angle between the subject's face and the target gaze point may comprise a depth angle, wherein the depth angle is calculated by estimating the distance between the camera and the subject's head and the distance between the camera and the gaze target point, and a spatial angle, wherein the spatial angle is the angle between the subject's head and the gaze target point in the plane of the image.

The method may further comprise inputting, using the training unit, the determined image information obtained for each image into the neural network (NN), wherein the NN is configured to generate a depth-infused saliency map for each image using the determined image information, determining, using the training unit, a loss function using the depth-infused saliency maps and the pseudo-labels, and, updating, using the training unit, one or more parameters of the NN to reduce the loss function. The loss function may, for example, be any one of: a binary cross entropy loss function, a dice loss function, a Jaccard distance function. It is to be appreciated that these are non-limiting examples of the types of loss function that may be used in accordance with at least some embodiments. The person of ordinary skill in the art will appreciate that alternative loss functions may also be used in accordance with the herein disclosed embodiments, and such alternatives also fall within the scope of the present disclosure.

In accordance with some exemplary, non-limiting embodiments, the neural network may be a segmentation network, and may include any one of a feature pyramid network (FPN), a U-Net, or a PSPNet.

In accordance with further aspects of the disclosure, a system configured to perform the aforementioned method, and a storage device comprising instructions for performing the aforementioned method, are disclosed.

BRIEF DESCRIPTION OF THE DRAWINGS

Exemplary embodiments of the disclosure will now be described with reference to the accompanying drawings, in which:

FIG. 8A is a table comparing the results achieved with the gaze target detection method of the present disclosure, compared to known methods, methods being evaluated on the VideoAttentionTarget data set and the GOO-Real dataset;

FIG. 8B is a table comparing the results achieved with the gaze target detection method of the present disclosure, compared to known methods, methods being evaluated on the GazeFollow dataset;

DETAILED DESCRIPTION

Figure 1A:
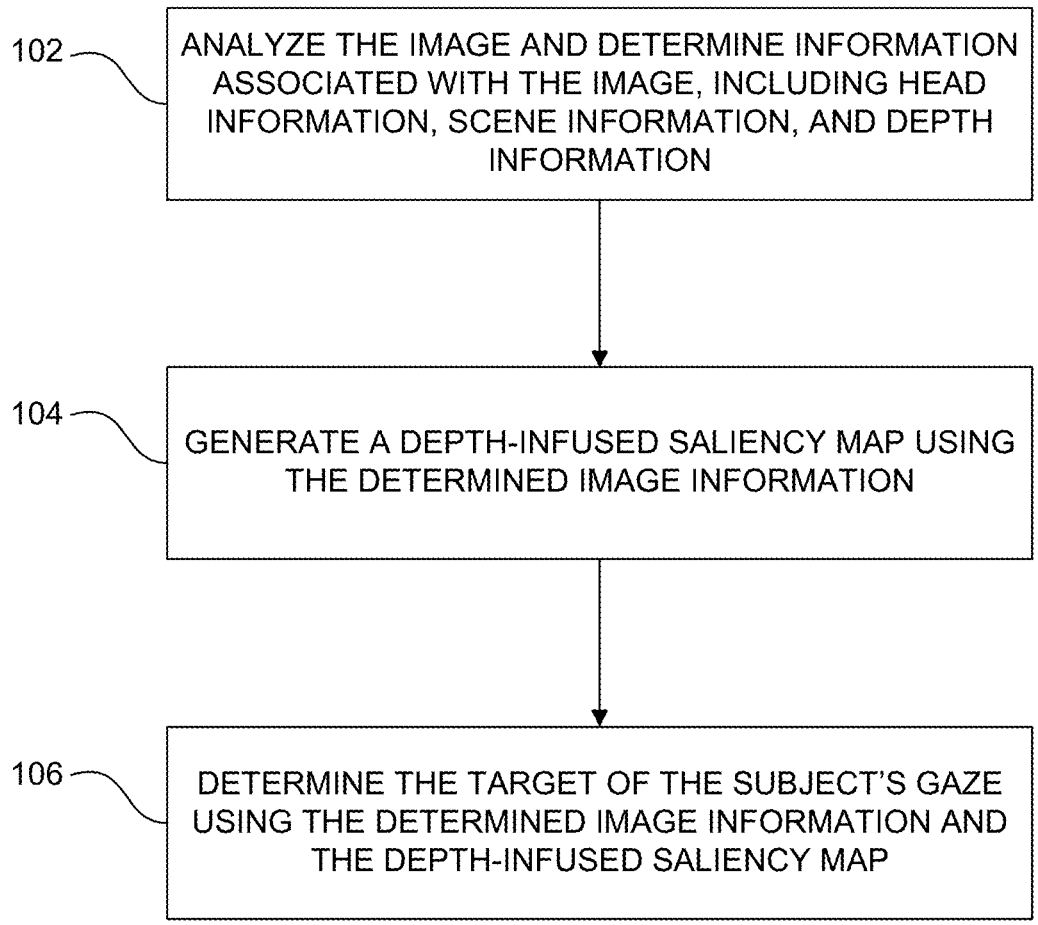
FIG. 1A is a process flow chart illustrating a method for gaze target determination, in accordance with embodiments of the disclosure.

Exemplary, non-limiting embodiments of the disclosure will now be described with reference to the accompanying drawings. Wherever possible, the same reference numbers are used in the accompanying drawings and the following description to refer to shared components. While several illustrative embodiments are described herein, modifications, adaptations, and other implementations are possible, without departing from the scope of the disclosure. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

The gaze target detection systems and methods according to the present disclosure introduce a novel Depth-Infused Saliency unit that provides input to a neural network to regress the gaze point. This Depth-Infused Saliency unit is a custom-built neural network, trained on previously generated pseudo-labels. The output of the Depth-Infused Saliency unit is then fed into a multi-modal fusion module, providing additional cues of the subject's gaze target. Additionally, the herein disclosed gaze target detection systems and methods introduce dedicated attention layers to process the scene from captured image data and depth units. This helps to enable the herein disclosed gaze target detection systems and methods to determine the target of a subject's gaze more accurately.

An advantage of the herein disclosed gaze target detection systems and methods is that they do not require any calibration. In addition, the herein disclosed gaze target detection systems and methods work well from a third person viewpoint as well as CCTV viewpoint. Furthermore, the herein disclosed systems and methods can also enable the target object of a subject's gaze to be determined, and are not limited to determining just the direction of the subject's gaze.

At least some of the herein disclosed embodiments comprise at least some of the following unique features:

Extraction of multiple information from a scene where a person's gaze has to be pinpointed to a target gaze point which involves determining the specific point or area a person is looking at in an image.

Projection of 2D Image to 3D point cloud in order to segment out the depth-infused saliency map during the training of the depth-infused saliency unit.

Incorporation of face detection including back-of-head detection of the person in the image to extract depth-related contextual cues. This feature aids in identifying the gaze target accurately and improves the gaze estimation in a variety of conditions and environments.

Gaze target estimation architecture that can beat the SOTA scores while tested on public datasets such as GazeFollow, VideoAttentionTarget and GOO (Gaze On Objects).

In accordance with at least some embodiments, an improved method of gaze target detection is provided, in which first a relative depth of the scene image may be estimated using depth estimation techniques. Depth information may provide additional contextual cues to aid in gaze determination. Based on an analysis of the image, a subject's head, scene, and depth information may be analyzed to extract contextual cues that help in determining the gaze target.

A method for training a neural network (NN) to generate a depth-infused saliency map is also provided. Using information determined from the image, including information associated with the head of the subject, the scene the subject is located within, and depth information, the depth image may be projected to a 3D point cloud using intrinsic camera parameters, creating pseudo-labels for the NN to be trained on.

Furthermore, the herein disclosed methods are evaluated on three publicly available datasets to quantify how well the disclosed methods perform compared to other methods. The experimental tests show that the herein disclosed methods outperform the prior art methods on these datasets in terms of accuracy and performance. The herein disclosed solution runs in real-time on relevant hardware.

FIG. 1A is a flow diagram depicting an exemplary method 100 for determining a target of a subject's gaze from an image. At step 102, an image of a scene comprising a subject is analyzed, and information associated with the image is determined. The image information may comprise information associated with a head of the subject in the image, information associated with the location of the subject within the scene, depth information associated with the subject, and one or more objects comprised in the scene. At step 104, the determined information is used to generate a depth-infused saliency map.

At step 106, the target of the subject's gaze is determined using the determined image information and the depth-infused saliency map.

Figure 1B:
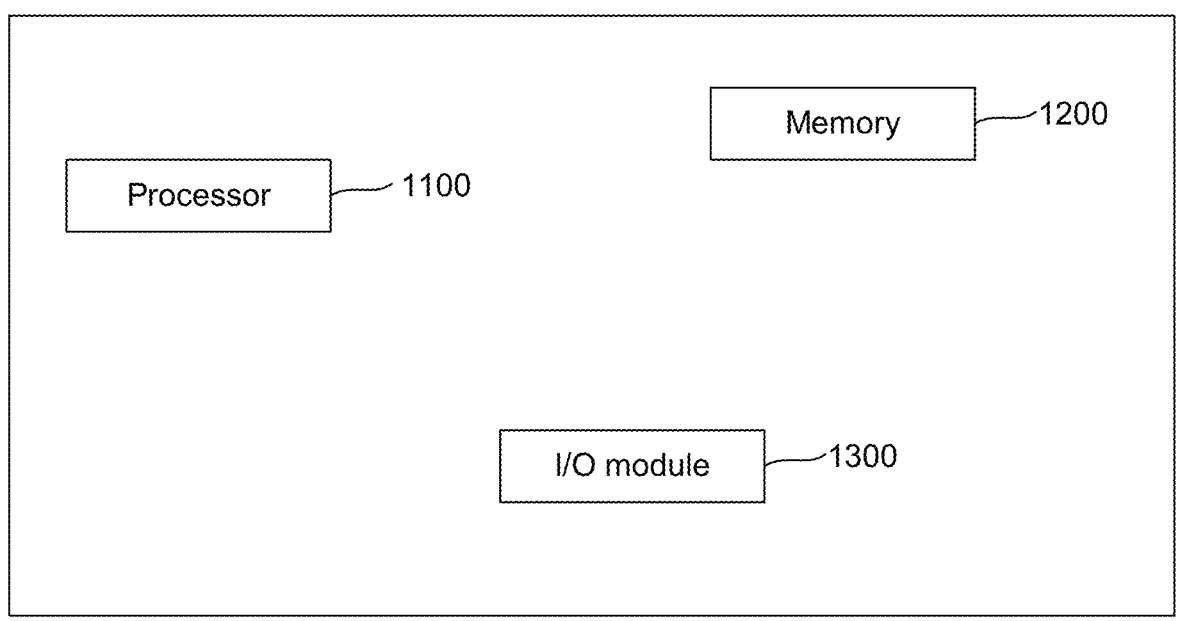
FIG. 1B is a schematic diagram illustrating the functional components of a system for gaze target detection that may be configured to implement the method described in FIG. 1A, in accordance with embodiments of the disclosure.
Figure 12:
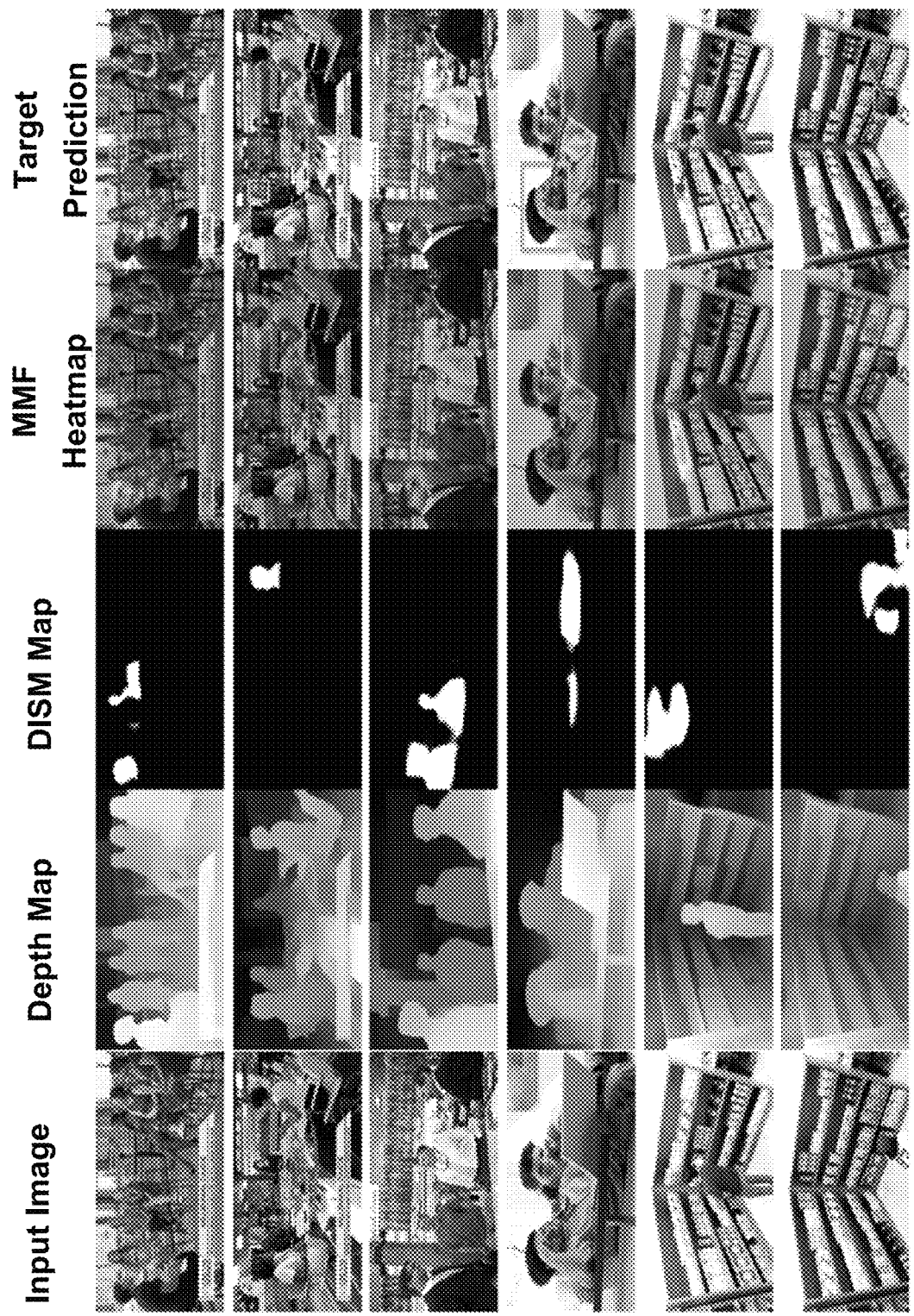
FIG. 12 provides example of gaze target prediction in multiple different scenes, illustrating the different steps of the method of FIG. 1A.

In accordance with some embodiments, method 100 may be implemented on system 1000 illustrated in FIG. 1B. FIG. 1B is a schematic diagram illustrating the functional components of system 1000 that may be configured to determine a target of a subject's gaze from an image, in accordance with at least some embodiments. System 1000 may comprise a processor 1100 and a memory 1200 capable of storing computer executable instructions, which when executed by processor 1100, configure processor 1100 to carry out the method of FIG. 1A. System 1000 may also include an I/O module 1300 to receive an input (e.g., image or video) and output a target of a subject's gaze for example. Steps of method 100 are illustrated in FIG. 12 for different images of various scenes.

Figure 1C:
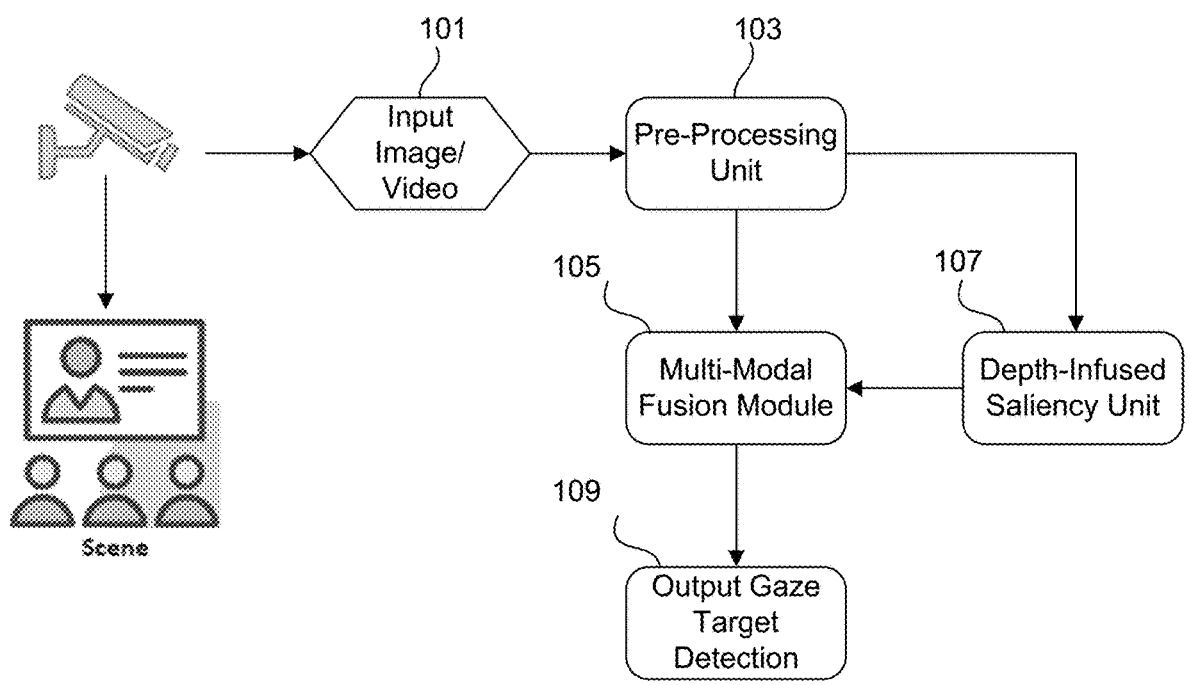
FIG. 1C is a flow chart illustrating the functional modules comprised in a system configured to carry out the method of FIG. 1A, in accordance with embodiments of the disclosure.

FIG. 1C outlines the functional modules comprised in a system configured to implement the method of FIG. 1A, in accordance with at least some embodiments of the disclosure. More specifically, FIG. 1C illustrates the functional components comprised in the system, and how these components work together to determine gaze target. The functional modules may be implemented in software and/or in hardware. For example, the functional modules may be implemented as software modules executed by processor 1100. Alternatively, the functional modules could be implemented in one or more dedicated hardware circuits.

Figure 4:
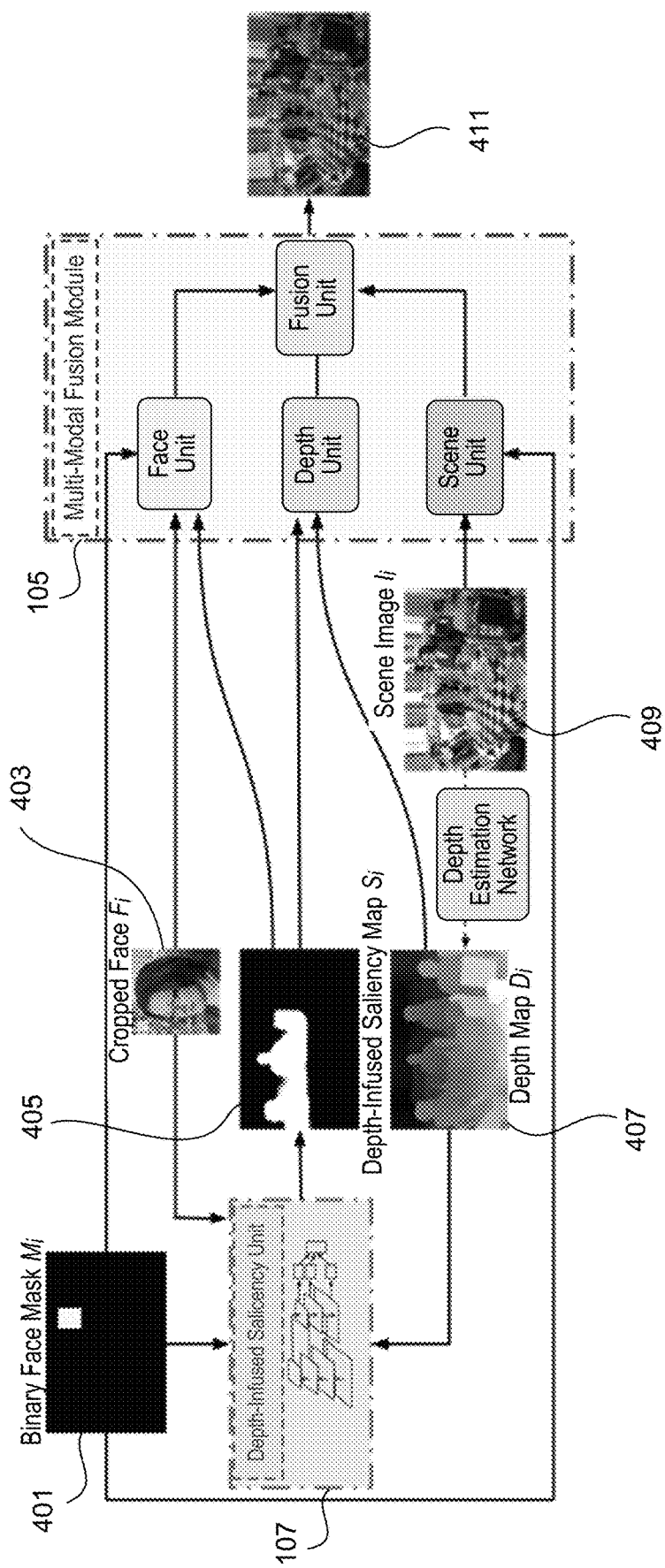
FIG. 4 is a flowchart illustrating how the Neural Network architecture of the system of FIG. 3 functions, in accordance with some embodiments.

An input video or image of the scene is received, at step 101 and may be input into pre-processing unit 103, which extracts distinct types of information, such as information associated with a head of the subject (e.g. may be extracted from cropped face 403, illustrated in FIG. 4), information associated with the location of the subject within the scene (e.g. may be extracted from binary face mask 401, illustrated in FIG. 4) and depth information associated with the subject and one or more objects comprised in the scene (e.g. may be extracted from depth map 407, illustrated in FIG. 4). The output from pre-processing unit 103 is input into multi-modal fusion module 105 and Depth-Infused Saliency unit 107. Multi-modal fusion module 105 is configured to perform multi-modal fusion. The output of the Depth-Infused Saliency unit 107 is input into the multi-modal fusion module and is used by multi-modal fusion module 107 in order to output the detected gaze target 109.

Figure 2:
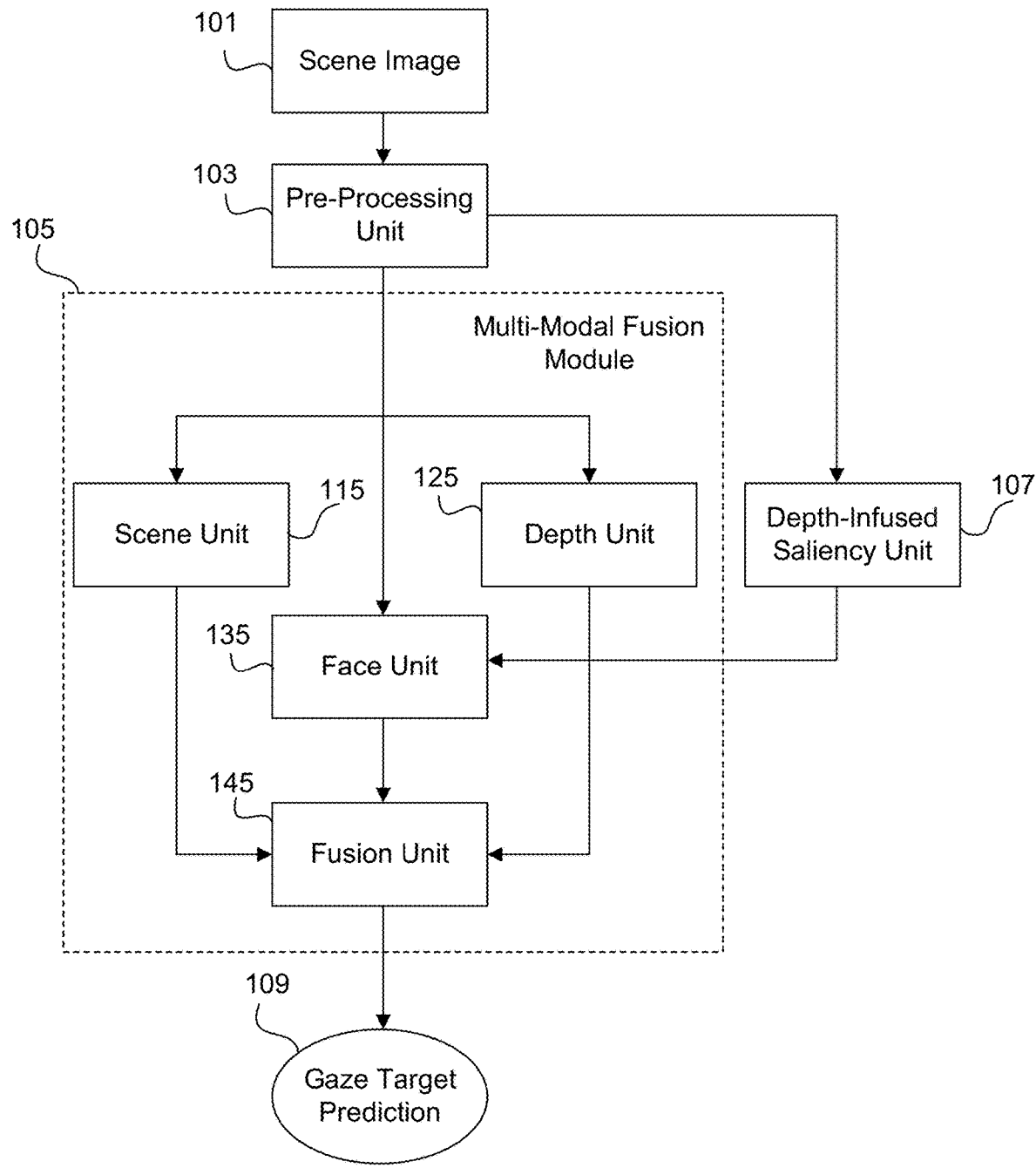
FIG. 2 is a flowchart illustrating the architecture of the multi-modal fusion module of FIG. 1C.

FIG. 2 provides further detail regarding the extraction and processing of information comprised in captured image data (in a scene image or video sequence) from the input and using sub algorithms e.g Scene unit 115, Depth unit 125, Face unit 135, Depth-infused Saliency unit 107 and Fusion unit 145, to accurately determine the subject's gaze direction and gaze target object. The herein disclosed methods may be carried out on video data, in which case the gaze detection method may be carried out on each image in the video.

The process of gaze target detection may be initiated with an input or multiple inputs in the form of an image or video sequence 101. FIG. 2 illustrates multiple units including Face unit 135, Scene unit 115 and Depth unit 125, Fusion unit 145 and the Depth-Infused Saliency unit 107. In accordance with at least some embodiments, the integration of these four components (Face unit 135, Scene unit 115, Depth unit 125, Fusion unit 145) along with Depth-Infused Saliency unit 107 results in a gaze target detection system which outputs an estimated gaze target detection score or heatmap 109, overlayed on top of the image in question.

Within the present context, by saliency is intended an estimation of the likelihood of the subject's fixation on an object in the image.

The Depth-Infused Saliency unit 107 in FIG. 2 is a type of custom-built neural network designed for the task of saliency prediction, which involves identifying objects and artefacts that are in the line-of-sight of the subject's gaze within the scene. In accordance with an embodiment, this network incorporates the architectural framework of the Feature Pyramid Network (FPN) which was originally developed for semantic segmentation tasks, into the context of saliency prediction. The network is designed to process inputs comprising a scene depth map (depth map 407, illustrated in FIG. 4), the spatial position of the head within the scene represented as a binary head position image (binary face mask 401, illustrated in FIG. 4), and the face image (cropped face 403, illustrated in FIG. 4).

Scene unit 115 in FIG. 2 learns the scene embedding. The scene image 409 is encoded with the spatial position of the head within the image (binary face mask 401) to extract the scene embedding. The feature weights of the Scene unit 115 are modulated by distillation of the depth-infused saliency map attention layer linear projection features from Face unit 135. This process, involving the combination of the scene embedding (the output of scene unit 115) and the depth-infused saliency map is illustrated in more detail in FIG. 5.

Estimating depth on the other hand, is a challenging task given that there may be multiple options in terms of estimating the distance from a particular viewpoint. Conventional depth estimation is ineffective as it leaves behind incomplete cues to the exact depth in a single RGB image, thereby causing deviation in the gaze target detection estimation. Recently, deep neural networks have mitigated this problem by exploiting multiple visual cues such as relative size, brightness, patterns and vanishing points extracted from an RGB image. Depth unit 125 takes the depth map 407 as input, which is combined with the depth-infused saliency map 405. The depth image embeddings (output of depth unit 125) are extracted after passing the inputs through the Depth unit 125. The depth image embeddings are also modulated by distillation of the binary face position mask attention layer linear projection features from Face unit 135. This process, involving the combination of the depth embedding (the output of depth unit 125) and binary face mask 401 is illustrated in more detail in FIG. 5.

Figure 9:
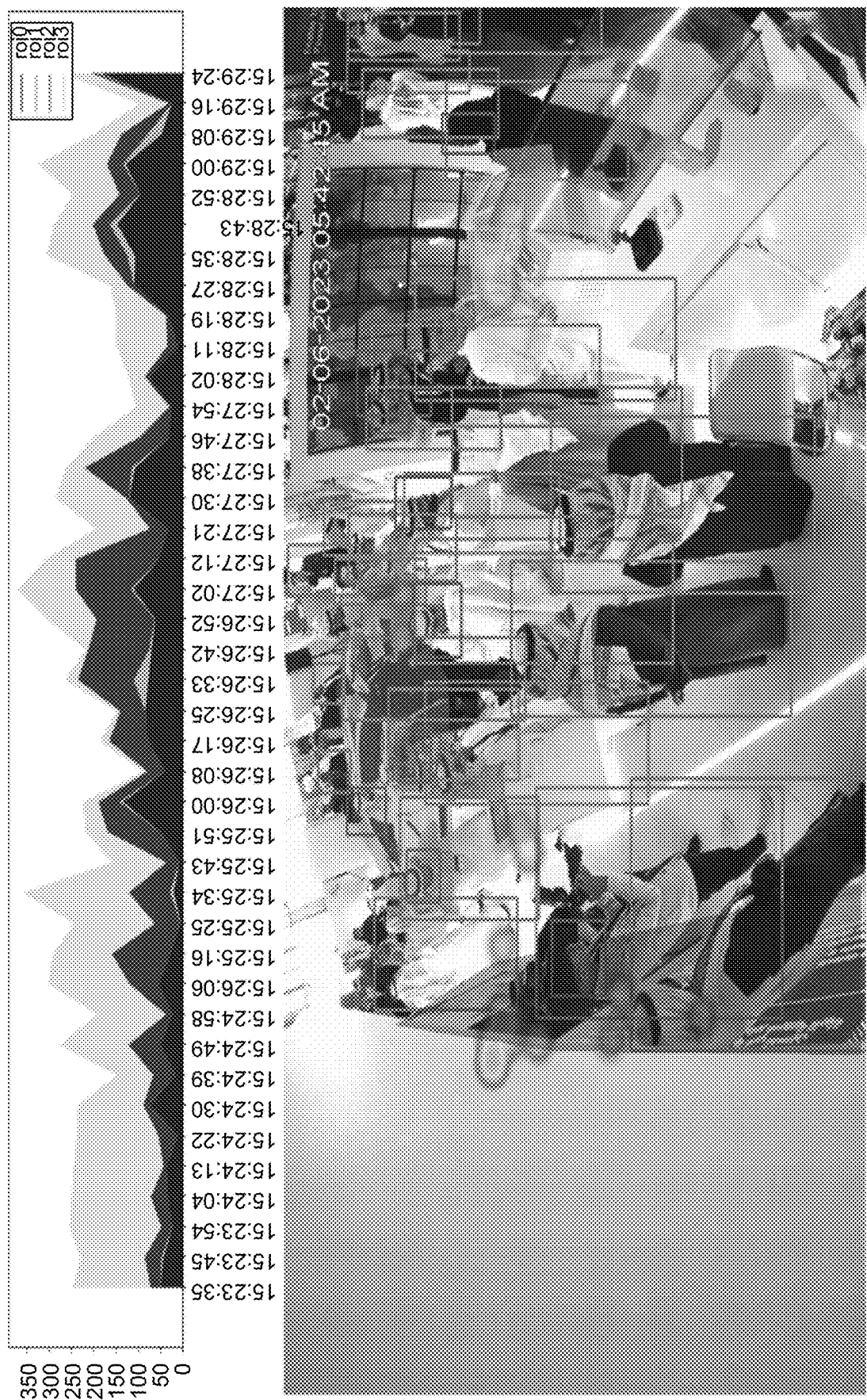
FIG. 9 provides an example of gaze target detection achieved with the gaze target detection method of the present disclosure in a conference room environment.
Figure 10:
FIG. 10 provides an example of attention estimation in an environment with multiple screens and a presenter achieved with the gaze target detection method of the present disclosure.
Figure 11:
FIG. 11 provides an example of attention estimation in an environment with multiple screens and a shifting gaze target prediction presentation achieved with the gaze target detection method of the present disclosure.

A deep learning framework can also be used for head localization and pose estimation on depth images to tackle issues arising from poor illumination conditions e.g., in low light and the illumination changes during the daytime. In the context of gaze target estimation in this invention disclosure, monocular depth estimation is concatenated with the depth-infused saliency map which encodes depth-based cues on the relevant 2D RGB image segment. This is what has been reflected in the disclosure throughout and the gaze target detection application built on top of this technique, and which has also been demonstrated multiple times. It is also important to note that the screen shot of images presented in FIGS. 9-11 have been produced using the purpose-built front-end application (incorporating the trained AI algorithms) as part of this disclosure.

In addition, the system also outputs a complete gaze target representation in multiple forms i.e., screen points, 3D space and view angles.

Figure 3:
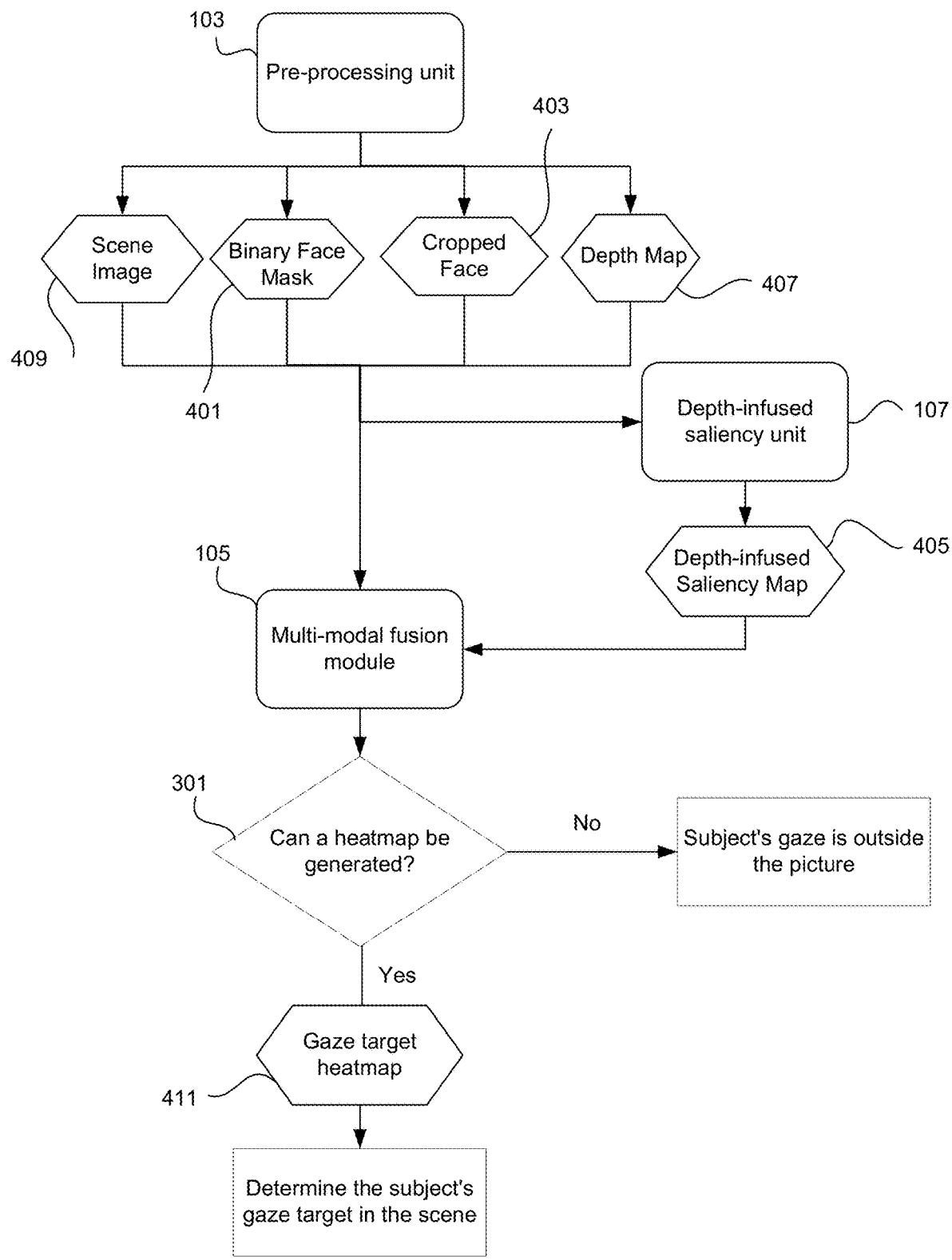
FIG. 3 is a flowchart illustrating the inputs and outputs and the multi-modal fusion module and depth-infused saliency unit of FIG. 2.

FIG. 3 shows the integration of multiple units comprised in the system, and their interaction hierarchy. Multi-modal fusion in this disclosure refers to the process of analyzing and combining information from multiple sources or modalities to determine the salient regions or areas of interest in an image, scene, or multiple frames in a video sequence. A modality in this context refers to a distinct type of information, such as visual (image or video), depth, audio, or textual data. Scene image 409 (illustrated in FIG. 4), binary face mask 401 (illustrated in FIG. 4), cropped face 403 (illustrated in FIG. 4), depth map 407 (illustrated in FIG. 4) and depth-infused saliency map 405 are the building blocks of the gaze target detection system which are fused within the training and inference pipelines to generate gaze target heatmap scores (based on certain thresholds) as an output of the system.

FIG. 3 also comprises determining, at step 301, whether the gaze target heatmap can be generated. If a heatmap can be generated, then the subject's gaze target may be determined from the gaze target heatmap. However, if the subject is looking at an object that lies outside of the captured image for example, then a heatmap cannot be generated. In this case, it is determined that the subject's gaze is focused on an object lying outside of the captured image. If a video or a sequence of images is being analyzed, the target of the subject's gaze may come into frame in a later image frame, if, for example, the subject's gaze is moving.

FIG. 4 provides further detail of how the multi-modal fusion process is implemented, using a neural network, in which two models i.e. Depth-Infused Saliency unit 107 and multi-modal fusion module 105 interact with each other to estimate gaze target point of a given subject in an image. The architecture comprises two units/modules: Depth-Infused Saliency unit 107 and multi-modal fusion module 105, and the output of the depth-infused saliency unit is input into the multi-modal fusion module.

Figure 5:
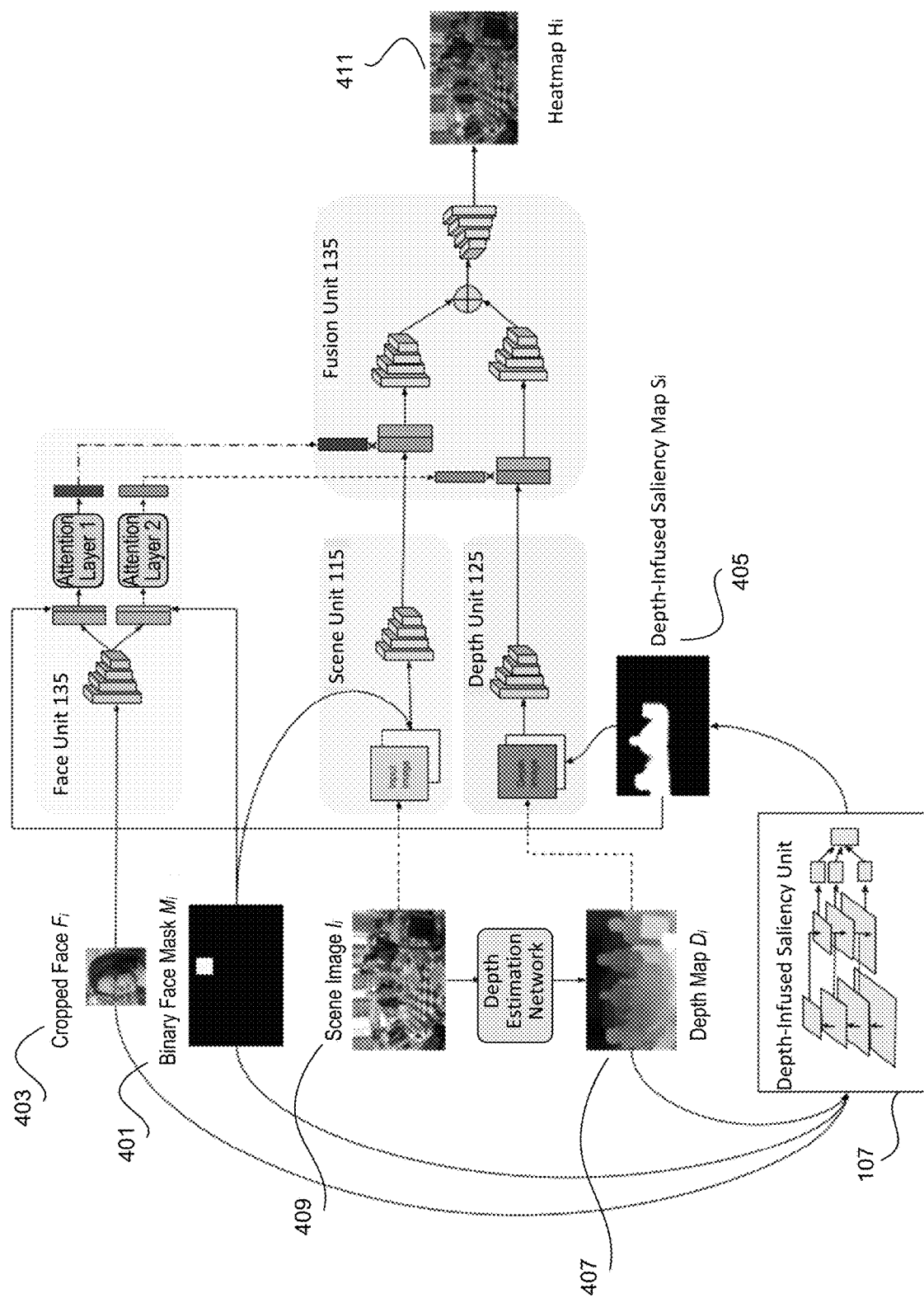
FIG. 5 is a flowchart illustrating how the Neural Network architecture of the multi-modal fusion module of FIG. 2 determines a gaze target, and illustrates the Neural Network architecture of the Face, Scene, Depth and Fusion units of FIG. 2, in accordance with some embodiments.

The exemplary AI deep neural network architecture of the Face, Scene, Depth and Depth-Infused Saliency components is illustrated in FIG. 5. Let us for example consider a data set A comprising N images such that $A=\{I_i, D_i, M_i, F_i\}_{i=1}^N$, where $I_i \in \mathbb{R}^{He_i \times W_i \times 3}$ is the i-th image in the dataset. $He_i$ and $W_i$ denote the width and height of image. $D_i$ is the depth map of $I_i$. The binary mask of the head position of the subject within the scene is denoted as $M_i$ and $F_i$ is the cropped face of the subject. The multi-modal fusion module, comprising the face unit 135, the scene unit 115, the depth unit 125 and the fusion unit 145, outputs a heatmap $H_i \in \mathbb{R}^{H_i \times W_i}$ reflecting the probability of the gaze fixation point for a subject within the scene, using the scene image $I_i$ 409, the depth map $D_i$ 407, the cropped face $F_i$ 403, the binary face mask $M_i$ 401, and the depth-infused saliency map $S_i$ 405. The multi-modal fusion module $f_{mm}$ 105 may be mathematically represented as:

$$H_i = f_{mm}(I_i, D_i, M_i, F_i, S_i)$$

Face unit 135 may be configured to take cropped face $F_i$ as an input. In exemplary embodiments it first down-samples $F_i$ to $e_i^F$, the facial embedding, by using average-pooling for example, before $e_i^F$ is separately processed by using a set of linear projections to learn the attention weights, and two copies of $e_i^F$ are made. Next, face unit 135 is bifurcated into two attentions layers i.e. spatial attention (Attention layer 2 in FIG. 5) and depth attention (Attention layer 1 in FIG. 5) respectively. The first attention layer down-samples the depth-infused saliency map $S_i$ 405, for example, using max-pooling, flattens the down-sampled depth-infused saliency map to ensure its dimension is compatible with $e_i^F$, creating down-sampled flattened depth-infused saliency map $e_i^S$, and finally concatenates $e_i^S$ with $e_i^F$. This enables objects and regions that lie alongside the line-of-sight of the head along the z-axis (that is it incorporates depth-based cues as well) to be identified, and helps identify the "depth relevance". The second attention layer down-samples the binary face mask $M_i$ 401, for example, using max-pooling, flattens the down-sampled binary face mask to have its dimension compatible with $e_i^F$, creating down-sampled flat binary face mask $e_i^M$ and finally concatenates $e_i^M$ with $e_i^F$. This enables capture of the relative spatial position of the subject's face within the image, and thus captures the "spatial relevance". This comprises the orientation of the head and the information regarding the spatial location of the head within the image (along x-y image axis)(2D plane).

Both attention layers (referred to as $attn_i^S$ for the first attention layer and $attn_i^M$ for the second attention layer in the following discussion) are represented as a set of linear projections $f_S$ and $f_M$, respectively. These linear layers are then passed through a softmax function that applies weightings to spatial and depth-relevant cues within the image.

$$attn_i^S = \Phi(f_S(e_i^F \oplus e_i^S))$$

$$attn_i^M = \Phi(f_M(e_i^F \oplus e_i^M))$$

where $\oplus$ denotes concatenation operation and $\Phi$ denotes SoftMax function.

The scene unit 115 takes as input the scene image $I_i$ and the binary face mask $M_i$. The two inputs are concatenated and passed through the scene unit to extract the scene embedding $e_i^I$.

The depth unit 125 takes the depth map $D_i$ and depth-infused saliency map $S_i$ as inputs. The two inputs are concatenated and passed through the depth unit to output depth embedding $e_i^D$.

The Scene 115 and Depth 125 units are pre-trained on the publicly available Places Dataset. The Places Dataset, also known as the "Places Database," is a large-scale dataset commonly used in computer vision research for scene recognition and understanding tasks. Pretrained model unit refers to the foundational architecture of a neural network model that has been previously trained on a large dataset to capture general patterns and features. This backbone architecture is usually a deep convolutional neural network (CNN) that has demonstrated its effectiveness in tasks like image recognition, object detection, or semantic segmentation. Furthermore, the Face unit is pre-trained on the publicly available EYEDIAP Dataset, which contains images or data related to eye tracking, gaze estimation, or similar tasks. EYEDIAP is a database for the development and evaluation of gaze estimation algorithms from 2D (RGB images) and 3D (RGB-D images). The Face unit refers to the part of a neural network architecture that is responsible for processing the cropped face. The Depth-infused saliency (DISM) unit further uses an FPN network with resnet-101 backbone to create saliency map that incorporates depth information. Here, FPN stands for "Feature Pyramid Network." It's a neural network architecture designed to handle multi-scale information in images. FPNs are often used in tasks like object detection, where objects can vary in size within an image. FPNs create a pyramid of feature maps from the network's intermediate layers, allowing the model to capture features at different scales. ResNet-101 is a specific variant of the ResNet architecture (Residual Network which is one of several Convolutional Neural Networks available for foundation level tasks in computer vision e.g. object detection) with 101 layers. ResNet is known for its deep architecture with skip connections that help alleviate the vanishing gradient problem during training, making it easier to train very deep networks.

As discussed previously, the depth-infused saliency unit refers to a particular part of our system that focuses on generating saliency maps (highlighting the most important regions) based on depth information, often combined with other visual cues in a scene or image or video sequences. The term "depth-infused" suggests that depth information is incorporated to enhance the quality or accuracy of these saliency maps.

Further, data augmentation techniques like random crop, colour manipulation and random flip image augmentation can be used during the training process to further enhance the algorithm learning capacity especially when tested on unseen or new data. Additionally, we randomly jittered the head bounding boxes to account for localization errors of out-of-box head detectors.

The fusion unit 135 takes as input the scene embedding $e_i^I$ (output of the scene unit), the depth embedding $e_i^D$ (output of the depth unit), the face embedding $e_i^F$ (output of the face unit), the depth relevance $\text{attn}_i^S$ (output of Attention layer 1) and the spatial relevance $\text{attn}_i^M$ (output of Attention layer 2). The depth embedding comprises information indicative of the relative distance between imaged objects comprised in the scene, the scene embedding comprises information indicative of the imaged objects comprised in the scene, and the facial embedding comprises information associated with the orientation of the head of the subject. The depth relevance $\text{attn}_i^S$, scene embedding $e_i^I$, and facial embedding $e_i^F$ are combined after being input in the fusion unit 135 to create the scene features. In some embodiments, the combination may comprise combining the depth relevance and scene embedding with element-wise multiplication and concatenating this first combination with the facial embedding:

$$(e_i^I \otimes \text{attn}_i^S) \oplus e_i^F$$

where $\otimes$ represents elementwise multiplication operation, and $\oplus$ denotes concatenation operation.

Similarly, the spatial relevance $\text{attn}_i^M$, depth embedding $e_i^D$, and facial embedding $e_i^F$ are combined after being input into the fusion unit 135 to create the depth features. According to some example embodiments, the combination may comprise combining the spatial relevance and depth embedding with element-wise multiplication and concatenating this first combination with the facial embedding:

$$(e_i^D \otimes \text{attn}_i^M) \oplus e_i^F$$

where $\otimes$ represents elementwise multiplication operation, and $\oplus$ denotes concatenation operation.

The scene and depth features are separately encoded using scene and depth encoders $f_e^I$ and $f_e^D$ and finally fused by summation before getting passed on to the decoder $f_d$ for regression of the gaze target heatmap $H_i$ 411. The multimodal fusion module $f_{mm}$ can thus alternatively be represented as:

$$H_i = f_{mm}(I_i, D_i, M_i, F_i, S_i) = f_d[f_e^I((e_i^I \otimes \text{attn}_i^S) \oplus e_i^F) + f_e^D((e_i^D \otimes \text{attn}_i^M) \oplus e_i^F)]$$

The ground-truth gaze heatmap, $\hat{H}_i$ is attained by overlaying a Gaussian weight centred around the target gaze point. The objective of the network is to minimize the Heatmap Loss $L_h$ which may be computed using Mean Squared Error (MSE) loss for cases when the gaze target is present inside the frame for N instances within the dataset.

$$L_h(H_i, \hat{H}_i) = \sum_{i=1}^{N}(H_i - \hat{H}_i)^2$$

Figure 13:
FIG. 13 illustrates a comparison between the results achieved with the gaze target detection method of the present disclosure, compared to a known gaze target point, the method being evaluated on the VideoAttentionTarget data set and the GOO-Real dataset.

The multi-modal fusion module 105 may be trained on the publicly available GazeFollow Dataset with full convergence after the completion of algorithm training with a set number of epochs (iterations). The GazeFollow Dataset is a large-scale dataset annotated with the location of where people in images are looking, which is related to gaze estimation or eye tracking. Gaze estimation datasets typically consist of images or videos along with corresponding gaze annotations, indicating where the person's gaze is directed within the scene. These datasets are used to train and evaluate models that predict gaze directions based on eye movements. The network is then fine-tuned on VideoAttention target dataset, VideoAttention being a dataset with fully annotated attention targets in video for attention target estimation. The dataset contains a collection of videos along with human-generated annotations that indicate where people are paying attention within those videos. These annotations could be in the form of gaze directions, indicating where participants are looking while watching the videos. The network was also trained from scratch using the publicly available GOO Dataset. The GOO (Gaze-on-Objects) is a dataset for gaze object prediction, where the goal is to predict a bounding box for a person's gazed-at object. GOO is composed of a large set of synthetic images (GOO Synth) supplemented by a smaller subset of real images (GOO-Real) of people looking at objects in a retail environment. The network uses Adam optimizer with a learning rate of 0.00025 and a batch size of 48. Performance of the herein disclosed architecture is evaluated on several public datasets. Some of the obtained results are presented in FIG. 8A and FIG. 8B to demonstrate the performance advantage of the herein disclosed methods over the prior art. Comparison between the target estimation obtained with the herein disclosed methods and the known gaze target point are shown in FIG. 13.

Figure 6:
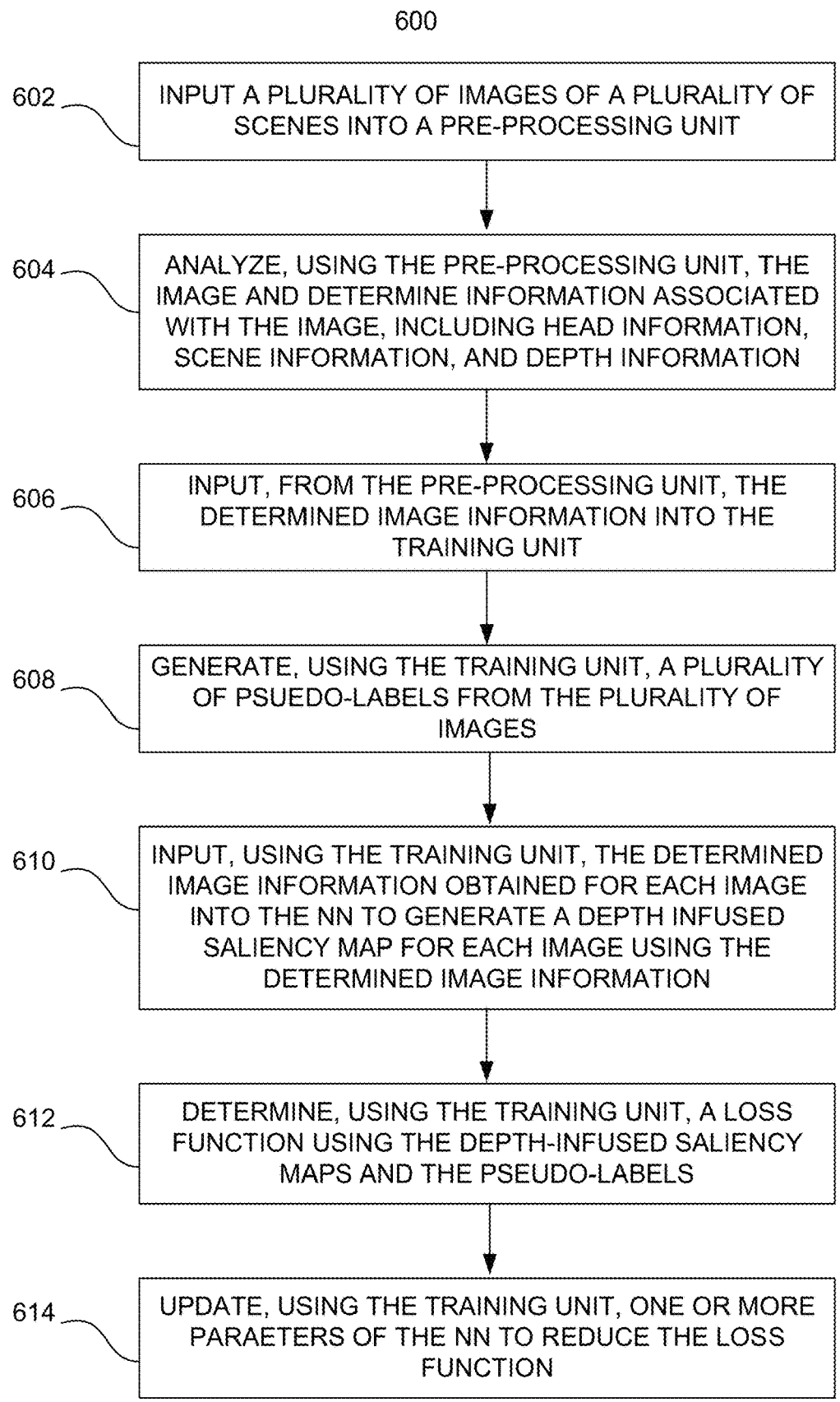
FIG. 6 is a process flowchart illustrating a method for training the depth-infused saliency unit of FIG. 7, in accordance with embodiments of the disclosure.

FIG. 6 is a flow diagram depicting an exemplary method 600 for training a neural network to generate a depth-infused saliency map for determining a target of a subject's gaze from an image of a subject within a scene. A segmentation neural network may be used for this. Non-limiting examples of a segmentation neural network include: a Feature Pyramid Network (FPN), a U-Net network, and/or a PSPNet network. In accordance with some embodiments, method 100 may be implemented on system 1000 illustrated in FIG. 1B.

At step 602, a plurality of images of a plurality of scenes are input into a pre-processing unit. Each image may for example comprise a subject located within a scene, and a known gaze target for the subject. At step 604, the pre-processing unit analyzes each image and determines information associated with each image. The information may for example comprise information associated with a head of the subject in each image, information associated with the location of the subject within each image, and depth information associated with the subject and one or more objects comprised in each image. According to some example embodiments, determining depth information associated with the subject and one or more objects comprised in each image may be performed by a depth estimating network, comprised in the pre-processing unit.

At step 606, the determined information of each image is input into the training unit from the pre-processing unit.

Figure 7:
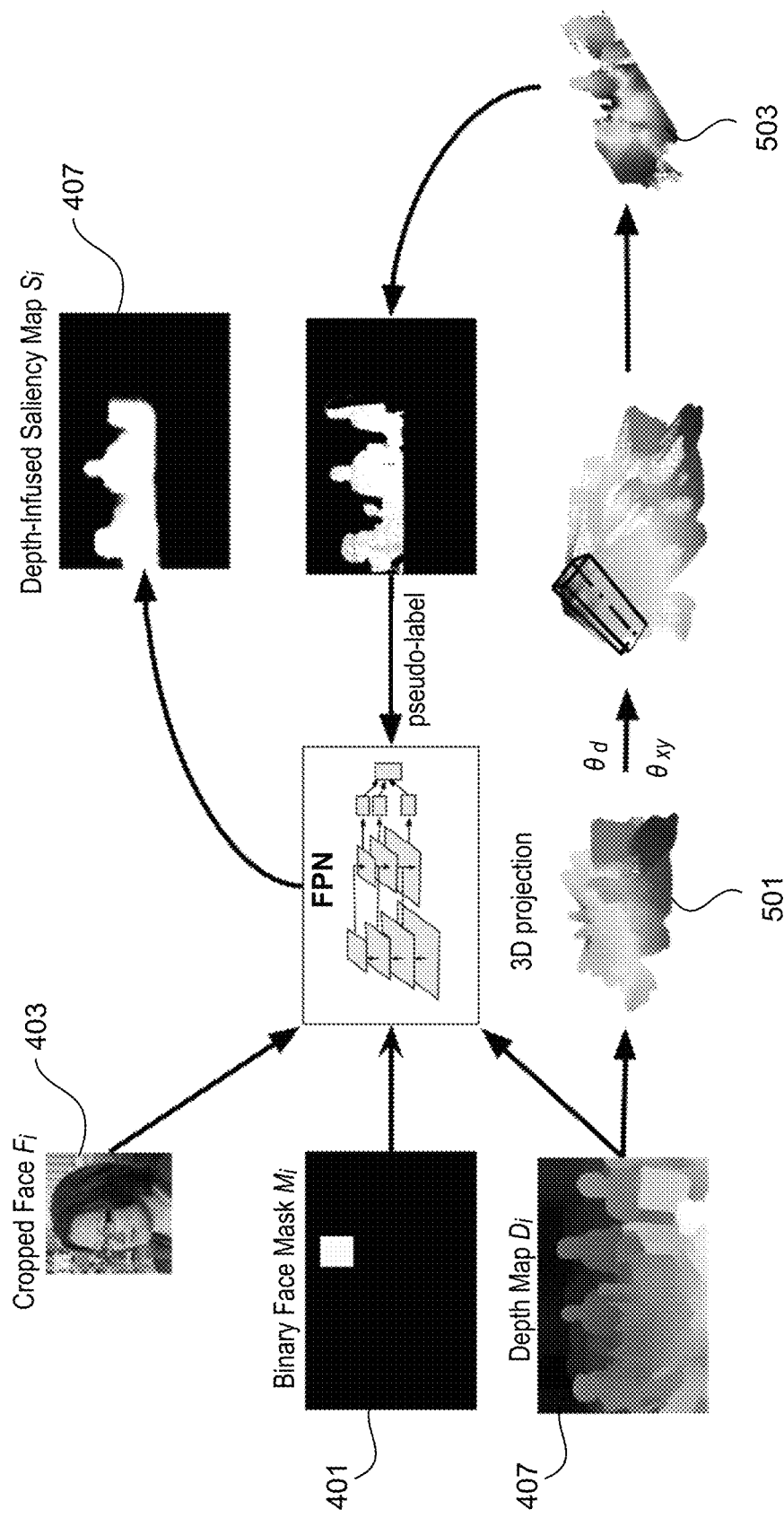
FIG. 7 is a flowchart illustrating the method of FIG. 6, in accordance with some embodiments.

At step 608, the training unit generates a plurality of pseudo-labels. The method for generating the pseudo-labels is detailed in FIG. 7. Depth map 407 is projected to a 3D point cloud 501. This is done by using the focal length ($f_x, f_y$) and optical centre ($c_x$, $c_y$) (intrinsic parameters) of the camera that captured the image being analyzed. The extrinsic parameters are assumed to be an identity matrix. The extrinsic parameters comprise primarily of the rotation/translation parameters of the camera in the world coordinate system. It is assumed that the rotation and translation parameters have a fixed value, to facilitate the calculations. Let $P_d$ be the collection of 3D projection points of the depth map $D_i$. For every pixel location (a, b) of the depth map, p is a point within the collection $P_d$ such that $$p = \begin{cases} p_x = \dfrac{(j - c_x) D_i[a, b]}{f_x} \\ p_y = \dfrac{(j - c_y) D_i[a, b]}{f_y} \\ p_z = D_i[a, b] \end{cases}$$

Where i and j correspond to the x and y coordinates of the image. For example, if the image has a resolution of 1920×1080, then x can range from 1 to 1920, and y can range from 1 to 1080. Thus, using i and j it is possible to iterate through every pixel location of the captured image.

Once the 3D point cloud is obtained, a cuboid 503 may be projected using information associated with the subject's face and the known target gaze point, that may include a depth angle $\theta_d$ and a spatial angle $\theta_{xy}$. The spatial angle $\theta_{xy}$ is extracted from the pixel positions of the eye ($e_x$, $e_y$) and the gaze target ($g_x$, $g_y$), and is bined into lower-right ($\theta_{xy_{lr}}$) (30°), straight ($\theta_{xy_s}$)(90°), lower-left ($\theta_{xy_{ll}}$)(150°), upper-left ($\theta_{xy_{ul}}$)(220°) and upper-right ($\theta_{xy_{ur}}$)(320°) directions. Given $\theta_{xy} \in \{\theta_{xylr}, \theta_{xys}, \theta_{xyu}, \theta_{xyul}, \theta_{xyur}\}$, the image angle $\alpha$ is discretized which assumes one of the values within $\theta_{xy}$, $\alpha$ is computed as:

$$\alpha = \arctan \frac{g_y - e_y}{g_x - e_x}$$

where the fraction calculates the gradient between the eye location and gaze fixation points. In embodiments where the eye of the subject are not comprised in the captured image, then it may be possible to use the midpoint of the subject's head, in place of the eyes.

The depth angle $\theta_d$ is calculated by estimating the depth of the face and gaze target point in the depth map, and is binned into forward ($\theta_{d_f}$)(90°), intermediate-forward ($\theta_{d_{if}}$)(45°), same-plane ($\theta_{d_s}$)(0°), intermediate-backward ($\theta_{d_{ib}}$)(−45°) and backward ($\theta_{d_b}$)(−90°) directions. $\theta_d$ is extracted using average depth of face $d_f$ and target points $d_t$, and empirically setting depth plane binning thresholds $\gamma_1$ and $\gamma_2$. The depth plane binning threshold may, for example, set to $\gamma_1 = 3$ and $\gamma_2 = 10$.

$$\theta_d = \begin{cases} \theta_{d_s}, & \text{if } d_f - d_t < \gamma_1 \\ \theta_{d_{if}}, & \text{if } \gamma_1 < d_f - d_t < \gamma_2 \\ \theta_{d_{ib}}, & \text{if } \gamma_1 < d_t - d_f < \gamma_2 \\ \theta_{d_f}, & \text{if } d_f - d_t > \gamma_2 \\ \theta_{d_b}, & \text{if } d_t - d_f > \gamma_2 \end{cases}$$

A sub-collection of 3D points that lie within the cuboid oriented along $\theta_d$ and $\theta_{xy}$ in 3D space is re-projected back to image plane and this serves as the psuedo-labels $\hat{S}_i$ for the segmentation neural network.

At step 610, the training unit inputs the determined image information obtained for each image into the neural network, wherein the neural network is configured to generate a depth-infused saliency map $S_i$ for each image using the determined image information. The depth-infused saliency map provides a segmentation of the regions within the image that the subject is most likely gazing at. For example, it could be the case that the depth-infused saliency map segments out the top half portion of a chair that appears in the field of view of a person.

At step 612, the training unit determined a loss function using the depth-infused saliency maps and the pseudo-labels. For example, the loss function may be a sum, or any other relevant mathematical operation, of individual loss functions calculated for each pair of depth-infused saliency map and pseudo-label. The individual loss functions may be indicative of the differences between a depth-infused saliency map and its corresponding pseudo-label, and may be calculated pixel by pixel.

At step 614, the training unit updates one or more parameters of the neural network to reduce the loss function. In accordance with some example embodiments, the aim of the loss function may be to minimize the Jaccard Distance (JD). JD is considered suitable for binary segmentation tasks or mask comparison, especially in the context of the disclosed method where precise delineation of regions matters a lot. The metric provides normalized measures of IOU along with computational efficiency and interpretability benefits which allows for meaningful comparison across different scales. The objective function to minimize JD is given by $L_j$ as:

$$L_j(S_i, \hat{S}_i) = 1 - \frac{(S_i \cdot \hat{S}_i) + \epsilon}{(S_i + \hat{S}_i - S_i \cdot \hat{S}_i) + \epsilon}$$

FIG. 8A and FIG. 8B illustrate the performance of a model trained in accordance with the above disclosed method (vis-à-vis other benchmark methods) on VideoAttention and GOO datasets (FIG. 8A) and GazeFollow dataset (FIG. 8B) datasets.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method of determining a target of a subject's gaze from an image of the subject within a scene, the method comprising:

analyzing the image and determining information associated with the image, the image information comprising:
  information associated with a head of the subject in the image;
  information associated with the location of the subject within the scene in the image; and
  depth information associated with the subject and one or more objects comprised in the scene;
generating, using a first trained neural network, a depth-infused saliency map using the determined image information; and
determining the target of the subject's gaze using the determined image information and the depth-infused saliency map.

2. The method of claim 1, wherein determining the target of the subject's gaze using the determined image information and the depth-infused saliency map comprises:
  generating a heatmap identifying one or more potential targets of the subject's gaze in the image, each potential target being associated with a probability score representing the likelihood that the subject target is the target of the subject's gaze.

3. The method of claim 1, wherein determining the target of the subject's gaze using the determined image information and the depth-infused saliency map comprises:
  identifying, using a second trained neural network, information associated with an orientation of the head of the subject, based on the information associated with the head of the subject in the image;
  identifying, using the second trained neural network, depth relevance information, based on information associated with the orientation of the head of the subject and the depth-infused saliency map, wherein the depth relevance information comprises information associated with one or more objects or a region that lie along a line-of-sight of the subject in the image; and
  identifying, using the second trained neural network, spatial relevance information, based on information associated with the orientation of the head of the subject and the information associated with the scene the subject is located within in the image, wherein the spatial relevance information comprises information indicative of the relative spatial position of the subject's head within the image.

4. The method of claim 1, wherein determining the target of the subject's gaze using the determined image information and the depth-infused saliency map, comprises:
  identifying, using a third trained neural network, information indicative of the imaged objects comprised in the scene, based on the image and the information associated with the scene the subject is located within in the image.

5. The method of claim 1, wherein determining the target of the subject's gaze using the determined image information and the depth-infused saliency map comprises:
  identifying, using a fourth trained neural network, information indicative of the relative distance between imaged objects comprised in the scene, based on the depth-infused saliency map and the depth information associated with the subject and one or more objects comprised in the scene.

6. The method of claim 1, wherein determining the target of the subject's gaze using the determined image information and the depth-infused saliency map further comprises:
  combining, using a fifth trained neural network, the depth relevance, the information indicative of the imaged objects comprised in the scene, and the information associated with an orientation of the head of the subject; and
  combining, using the fifth trained neural network, the spatial relevance, the information indicative of the relative distance between imaged objects comprised in the scene, and the information associated with an orientation of the head of the subject.

7. A method of training a neural network to generate a depth-infused saliency map for determining a target of a subject's gaze from an image of the subject within a scene, the method comprising:
  inputting a plurality of images of a plurality of scenes into a pre-processing unit;
  analyzing, using the pre-processing unit, the images and determining information associated with the images, the image information comprising:
    information associated with a head of the subject in each image;
    information associated with the location of the subject within the scene in each image; and
    depth information associated with the subject and one or more objects comprised in each image;
  inputting, from the pre-processing unit, the determined image information for each image into a training unit;
  generating, using the training unit, a plurality of pseudo-labels from the plurality of images;
  inputting the determined image information obtained for each image into the neural network (NN), wherein the NN is configured to generate a depth-infused saliency map for each image using the determined image information;
  determining, using the training unit, a loss function using the depth-infused saliency maps and the pseudo-labels; and
  updating, using the training unit, one or more parameters of the NN to reduce the loss function.

8. The method of claim 7, wherein generating a pseudo-label from an image comprises:
  generating a 3D point cloud using the depth information associated with the subject and one or more objects comprised in the image, and one or more parameters of the camera that captured the image;
  generating a projected cuboid using the 3D point cloud and information associated with the angle between the subject's head and a known target of the subject's gaze; and
  projecting the cuboid in an image plane.

9. The method of claim 7, wherein the neural network is a segmentation neural network.

10. The method of claim 9, wherein the neural network comprises any one of: a feature pyramid network (FPN), a U-Net, a PSPNet.

11. The method of claim 8, wherein the information associated with the angle between the subject's face and the target of the subject's gaze comprises any one or more of:
  a depth angle; and
  a spatial angle.

12. The method of claim 11, wherein the depth angle is calculated by estimating a distance between the camera and the subject's head, and a distance between the camera and the target of the subject's gaze.

13. The method of claim 11, wherein the spatial angle is the angle between the subject's head and the target of the subject's gaze in the plane of the scene image.

14. The method of claim 7, wherein the loss function comprises any one of: a binary cross function, a dice loss function, a Jaccard distance function.

15. A system for determining a target of a subject's gaze from an image of the subject within a scene, the system comprising:
- a pre-processing unit configured to determine image information from an input image, the image information comprising:
  - information associated with a head of the subject in the image;
  - information associated with the location of the subject within the scene; and
  - depth information associated with the subject and one or more objects comprised in the scene;
- a depth-infused saliency unit configured to generate a depth-infused saliency map using the determined image information; and
- multi-modal fusion module configured to determine the target of the subject's gaze using the determined image information and the depth-infused saliency map.

16. The system of claim 15, wherein the multi-modal fusion module is configured to:
- generate a heatmap identifying one or more potential targets of the subject's gaze in the image, each potential target being associated with a probability score representing the likelihood that the subject target is the target of the subject's gaze.

17. The system of claim 15, wherein the multi-modal fusion module comprises:
- a face unit, configured to:
  - identify, using a trained neural network, information associated with the location of the subject within the scene, based on the information associated with the head of the subject in the image;
  - identify, using the trained neural network, depth relevance information, based on information associated with the orientation of the head of the subject and the depth-infused saliency map, wherein the depth relevance information comprises information associated with one or more objects or an image region that lie along a line-of-sight of the subject in the image; and
  - identify, using the trained neural network, spatial relevance information, based on information associated with the orientation of the head of the subject and the information associated with the location of the subject within the scene, wherein the spatial relevance information comprises information indicative of the relative spatial position of the subject's head within the image.

18. The system of claim 15, wherein the multi-modal fusion module comprises:
- a scene unit, configured to:
  - identify, using a trained neural network, information indicative of the imaged objects comprised in the scene, based on the image and the information associated with the location of the subject within the scene.

19. The system of claim 15, wherein the multi-modal fusion module comprises:
- a depth unit, configured to:
  - identify, using a trained neural network, information indicative of the relative distance between imaged objects comprised in the scene, based on the depth-infused saliency map and the depth information associated with the subject and one or more objects comprised in the scene.

20. The system of claim 15, wherein the multi-modal fusion module comprises:
- a fusion unit, configured to:
  - combine, using a trained neural network, the depth relevance, the information indicative of the imaged objects comprised in the scene, and the information associated with an orientation of the head of the subject;
  - combine, using the trained neural network, the spatial relevance, the information indicative of the relative distance between imaged objects comprised in the scene, and the information associated with an orientation of the head of the subject.

21. The system of claim 15, wherein the neural network comprises a convolutional neural network (CNN).

22. A system for training a neural network to generate a depth-infused saliency map for determining a target of a subject's gaze from an image of the subject within a scene, the system comprising:
- a pre-processing unit configured to:
  - receive, as an input, a plurality of images of a plurality of scenes;
  - analyze, the images and determine information associated with the images, the image information comprising:
    - information associated with a head of the subject in each image;
    - information associated with the location of the subject within the scene in each image; and
    - depth information associated with the subject and one or more objects comprised in each image;
- a training unit configured to:
  - receive the plurality of images of the plurality of scenes;
  - receive the determined image information for each image from the pre-processing unit;
  - generate a plurality of pseudo-labels from the plurality of images;
  - input the determined image information for each image into the neural network (NN), wherein the NN is configured to generate a depth-infused saliency map for each image using the determined image information;
  - determine a loss function using the depth-infused saliency maps and the pseudo-labels received from the NN; and,
  - update one or more parameters of the NN to reduce the loss function.

23. The system of claim 22, wherein the training unit is configured to:
- generate a 3D point cloud using the depth information associated with the subject and one or more objects comprised in the image, and intrinsic parameters of the camera;
- generate a projected cuboid using the 3D point cloud and information associated with the angle between the subject's face or head and the known target gaze point; and,
- project the cuboid in the image plane.

24. The system of claim 22, wherein the information associated with the angle between the subject's face and the target gaze point comprises:
- a depth angle; and
- a spatial angle.

25. The system of claim 24, wherein the depth angle is calculated by estimating the distance between the camera and the subject's head and the distance between the camera and the gaze target point.

26. The system of claim 24, wherein the spatial angle is the angle between the subject's head and the gaze target point in the plane of the scene image.

27. A processor for determining a target of a subject's gaze from an image of the subject within a scene, the processor being configured to carry out the method of claim 1.

28. A non-transitory computer readable storage device comprising computer executable instructions for determining a target of a subject's gaze from an image of the subject within a scene, which when executed on a processor, configure the processor to carry out the method of claim 1.

* * * * *